United States Patent [19]

Gesser

[11] Patent Number: 4,892,719
[45] Date of Patent: Jan. 9, 1990

[54] REMOVAL OF ALDEHYDES AND ACIDIC GASES FROM INDOOR AIR

[76] Inventor: Hyman D. Gesser, 218 Girton Blvd., Winnipeg, MB, Canada, R3P 0A7

[21] Appl. No.: 235,493

[22] Filed: Aug. 24, 1988

[51] Int. Cl.$^4$ .................. B01J 8/00; C10H 23/00
[52] U.S. Cl. .................................................. 423/245.1
[58] Field of Search .............. 423/245 R, 245 S, 243

[56] References Cited

U.S. PATENT DOCUMENTS 3,681,015  8/1972  Gelbein et al. ................. 423/243
4,547,350 10/1985  Gesser ............................. 423/245

FOREIGN PATENT DOCUMENTS 1241524  9/1988  Canada .

Primary Examiner—Gregory A. Heller

[57] ABSTRACT

Indoor pollutants such as formaldehyde or acidic gases such as $SO_2$, $SO_3$, $NO_x$ and $H_2S$ can be removed from a house by a reactive method consisting of a coating on a furnace filter in a forced air heating system. The coating is a polymeric substance with specific functional groups which react with the pollutant and which in the case of formaldehyde or other aldehydes such as acrolein or acetaldehyde would be polymeric hydrazine or polymeric amine such as polyethylenimine, polyallylamine, or polyvinylamine. The coating is plasticized with a low volatile liquid such as glycerol in order to extend the useful life of the coating.

12 Claims, 1 Drawing Sheet

REMOVAL OF ALDEHYDES AND ACIDIC GASES FROM INDOOR AIR

BACKGROUND OF THE INVENTION

This invention is related to a simple, new and useful method whereby some or all of a specific indoor pollutant can be removed.

Conventional methods usually involve the adsorption of such pollutants onto activated surfaces such as charcoal, silica gel, alumina or other meterials with large surface areas, (see R. E. Goddard & J. A. Coles, Canadian Pat. #626,216 and J. W. Kasmark Jr., M. L. Dooley & A. H. Jones, U.S. Pat. #4,227,904).

Another conventional method is to use a solution to react with the specific gas, (see M. A. Kise, Canadian Pat. #643,062).

Such methods are usually non-specific and quite expensive to produce and operate. In the case where aqueous solutions are used the air becomes saturated with water and higher humidity levels result. In the case of adsoprtion systems, the pollutant, usually present in trace quantities, must compete with oxygen, nitrogen, carbon dioxide and water in the air in order to be adsorbed to a significicant extent. The adsorption is also temperature dependent and not always complete as far as the pollutant is concerned.

Though Gaylord (U.S. #4,374,814) has described a reactive coating to remove formaldehyde, his polyhydric water-soluble polymers requires moisture as well as an acidic or basic catalyst to effect reaction between formaldehyde and the coated polymer. Furthermore, the reduction of formaldehyde by Gaylord is far from complete and residual levels are in excess of the accepted TLV level of 0.1 ppm.

Gesser (U.S. #4,547,350) has shown that polymeric amines and hydrazines can trap formaldehyde efficiently. However, the coating through effective for one week ceased to remove formaldehyde from air soon after that due to the surface coating formed by reaction and the inability of this layer to exchange with the bulk unreacted amine in the film. Thus a very small fraction of the amine in the film is actually effective and consumed by reaction. This invention describes a method whereby the concentration of aldehyde and in particular formaldehyde can be reduced to levels far below the Toxic level (TLV=0.10 ppm), and where the concentration of $H_2S$ can be reduced to such small concentrations so as to be no longer present as an odor problem (i.e. $[H_2S] \approx 0.01$ ppm).

SUMMARY OF THE INVENTION

The present invention describes a simple and efficient method of removing indoor pollutants by allowing them to react with a polymeric substance which contains specific functional groups which react with and form chemical bonds with the specific pollutant. Different functional groups can be used for different pollutants. Acidic carboxylic acid groups (—COOH) or sulfonic acid groups (—$SO_3H$) can remove basic gases such as ammonia, or amines, whereas basic groups such as amines can removed acidic gases such as hydrogen halides, hydrogen sulfide, oxides of nitrogen as well as oxides of sulfur.

Since the polymer is non-volatile and of high molecular weight the product of the reaction between the pollutant and the functionalized polymer is a solid and the result is that the pollutant is removed from the air. The polymer, which can be coated onto an air filter fitted with a fan does not contribute gases to the air nor is its reactivity impaired by the presence of other gases. The use of two coated filters in series, each treated with different functionalized polymers could be used to remove different pollutants.

DESCRIPTION OF THE PREFERRED EMBODIMENT

Figure 1:
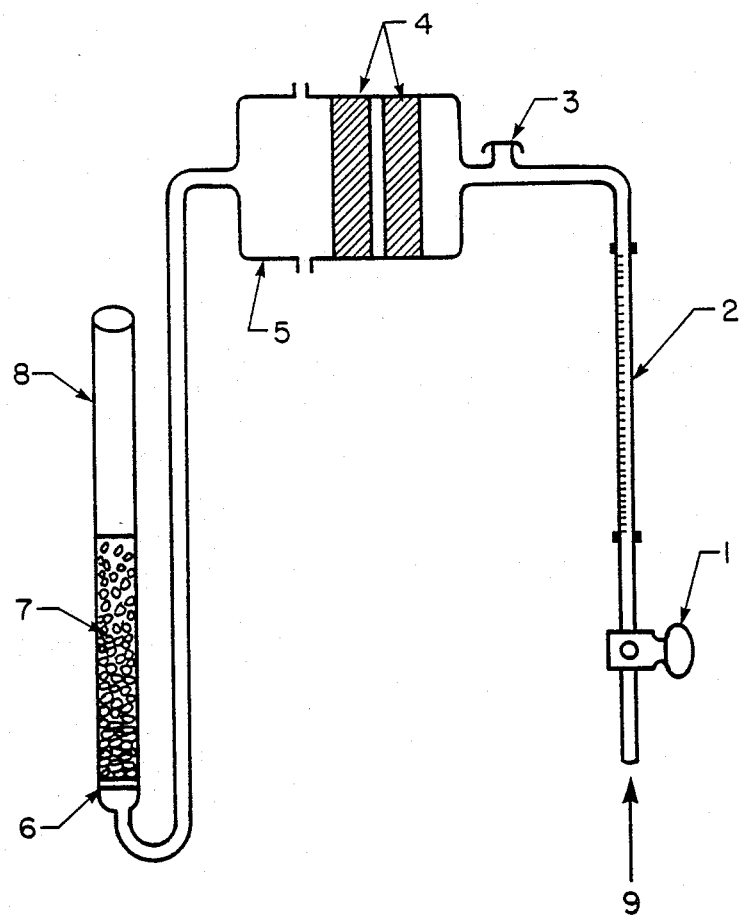
FIG. 1 is a drawing of the apparatus used to test the effectiveness of the polymeric amine/glycerol coated filter for its ability to remove acidic gases from air or nitrogen streams.

I have shown that a typical pollutant such as formaldehyde, which may come from the decomposition of urea-formaldehyde foam insulation or from the resin used in plywood or particle board, can be removed by passing the air in the house through a fiberglass filter coated with a thin layer of a polymeric amine such as polyethylenimine. Polyethylenimine is a water soluble polymer with primary, secondary and tertiary amine functional groups which react with aldehydes as well as acidic gases.

Many houses use a forced air furnace as a means of supplying heat. Such furnaces heat air which is circulated through the house by means of a fan and which usually includes a filter to remove the dust and particulate matter in the house. By coating such a filter with a polymeric substance having suitable functional groups, it is possible to remove the pollutant from the air as it is circulated through the filter. Open cell polyurethane foam filters can also be treated in this manner. The coated filter must be replaced periodically, usually after about a month or two depending on the concentration of dust and the pollutant in the air, the size of the house, the size of the filter and the amount of polymeric coating applied. Table 1 shows the results of testing coated filters in four houses.

TABLE 1

Results of Formaldehyde Abatement in Four Houses with Treated Furnace Filters.

| Condition | | [HCHO]μL/L(ppm) |
|---|---|---|
| (1) Polyethylenimine | | |
| House A. | Initial | 0.090 |
| | After filter in use 6 days | 0.005 |
| | After 4 days without filter | 0.083 |
| | After filter in use 5 days | 0.010 |
| House B. | Initial | 0.102 |
| | After filter in use 12 days | 0.036 |
| | After 6 days without filter | 0.084 |
| | After filter in use 6 days | 0.005 |
| (2) Polyethylenehydrazine | | |
| House C. | Initial | 0.159 |
| | After filter in use 4 days | 0.064 |
| | After filter in use 3 more days | 0.005 |
| House D. | Initial | 0.136 |
| | After filter in use 4 days | 0.013 |

The reactive coating on the surface of the filter can soon become exhausted by reaction and for the coating to be of further use, the pollutant must diffuse through the solidified coating. This is a slow process and as a result the effectiveness of the coating is thus reduced as time progresses. This defect can be alleviated by softening the coating with a plasticizer such as ethylene glycol, glycerol, diethyleneglycol or propylene glycol. These water soluble polyols allow the reactive polymer to diffuse within the coating and allows the exchange between surface and bulk material. Aldehydes such as acrolein and acetaldehyde which are often present in houses (see Indoor Pollutants, National Academy Press, Washington, D.C. 1981) are also removed by polyethylenimine or other polymeric amines such as polyvinylamine or polyallylamine or polymeric hydrazines such as polyethylenehydrazine.

EXAMPLE 1

A one storey bungalow (with basement) which had urea formaldehyde foam insulation had levels of formaldehyde which were from 0.085 to 0.120 ppm. When a fiberglass filter (16"×20"×1") was treated with polyethylenimine (PEI), 150 mL of 5% PEI in water (6.2 g PEI on filter) the level of formaldehyde dropped to 0.015 ppm within a week but after an additional 10 days rose to 0.095 ppm. When a similar filter was treated with 150 mL of a 5% polyethylenimine solution of glycerol/water, 30/70 by volume, the level of formaldehyde remained below 0.040 ppm for one month.

A test chamber was constructed from part of a small laboratory which was partitioned off with polyethylene (10 mil) but not thoroughly sealed. The dimensions of the test chamber was approximately 5 ft×6 ft×10 ft high. A small fan thoroughly mixed the air in the chamber. Formaldehyde was introduced into the chamber by passing air at about 700 mL/min over paraformaldehyde maintained at 85° C.

Formaldehyde was analysed by pulling air through 25 mL of water at a flow rate of 750 mL/min for 20 min. The formaldehyde in the water was determined by the pararosaniline method at 570 nm in a 10 cm cell (see H. Gesser, Environment International, Vol 10, pp. 305, 1984).

When the concentration of formaldehyde in the chamber reached a high steady state, i.e. about 0.3 ppm, a fan holding a 20"×20"×1" filter was turned on and air was pulled through the filter which was coated with PEI/glycerol. The results showed that the formaldehyde concentration in the chamber slowly decreased and remained low. When the fan holding the filter was turned off the formaldehyde level increased back to the initial value. This cycling (Table 2) was repeated several times proving that the coating is effective in removing the formaldehyde.

The length of time that the coated filter can be effective in removing pollutants is determined by its capacity or the amount of effective amine that can react. This was evaluated by determining the amount of amine used to coat a filter, the change in concentration of formaldehyde in the chamber due to the filter, and the volume of the chamber (about 10m$^3$).

EXAMPLE 2

A 20"×20"×1" filter (mounted on a 20"×20" fan) was spray coated with 150 mL of a 5% PEI solution which was 40% by volume glycerol (7.5 g PEI. The unit was placed in the test chamber and formaldehyde was introduced into the chamber at a constant rate by heating paraformaldehyde to 80° C. and passing air over it and into the chamber at about 1000 mL/min. The paraformaldehyde was weighed to determine the rate at which the formaldehyde entered the chamber.

TABLE 2

Formaldehyde Removal by PEI/Glycerol Coated Filter. Formaldehyde Introduced into Chamber at a Constant Rate.

| Date | | Conditions | [H$_2$CO] (ppm) |
|---|---|---|---|
| Feb. 11 | (am) | no coating on filter | 0.102 |
| 12 | (am) | | 0.391 |
| | (pm) | | 0.242 |
| | | coated filter installed (fan on) | |
| 13 | (am) | | 0.116 |
| | (pm) | | 0.078 |
| 14 | (am) | | 0.045 |
| 15 | (am) | | 0.031 |
| 16 | (am) | | 0.021 |
| | | Fan turned off | |
| 17 | (am) | | 0.051 |
| 18 | (am) | | 0.081 |
| 18 | (pm) | | 0.215 |
| 19 | (am) | | 0.370 |
| | (pm) | | 0.364 |
| 20 | (am) | | 0.328 |
| | | Fan turned on | |
| | (pm) | | 0.195 |
| 21 | (pm) | | 0.123 |
| 22 | (pm) | | 0.106 |
| 23 | (am) | | 0.046 |
| 24 | (am) | | 0.034 |
| | (pm) | | 0.026 |
| 24 | (pm) | Fan turned off Filter still in chamber | |
| 25 | (am) | | 0.373 |
| | (pm) | | 0.368 |

Formaldehyde in the air was analysed as above. A small fan circulated the air in the chamber. The fan which passed air through the coated filter was initially off and was turned on from outside the chamber when the formaldehyde level was shown to be approximately constant.

The results are shown in Table 3 and indicate that the coating is effective in lowering the concentration of formaldehyde in the chamber but that as expected it eventually gets used up and ceased to be effective.

The amount of formaldehyde in the air of the chamber is of the order of 1 to 3 mg. The theoretical amount of formaldehyde that the PEI can react with is determined by the number of amine groups available. This is (7.5 g) divided by (43 g/mol)=0.17 moles or 0.17 mol×30 g/mol or approximately 5.2 g of formaldehyde. However, formaldehyde only reacts with primary and secondary amines but PEI also contains some tertiary amines which are ineffective. The sample of PEI used in this experiment was determined by NMR (see T. St. Pierre and M. Geckle. $^{13}$C-NMR Analysis of Branched Polyethyleneimine, J. Macromolecular Sciences-Chem. Vol. 22A, pp. 877–887, 1985) to be 35% primary, 37% secondary and 28% tertiary amine. Hence the capacity is 0.72×5.2 or 3.7 g. Also as the PEI gets consumed the rate at which the unreacted PEI can trap formaldehyde probably decreases and as a result the effectiveness of the coating must also decrease. This is confirmed by the results in Table 3.

TABLE 3

Capacity of PEI/Glycerol Fliter Theoretical Capacity 3.7 g HCHO.

| Time hr | Time Interval hr | Rate of Weight Loss of Paraformaldehyde mg/hr | [HCHO] ppm | [HCHO] μg/m$^3$ |
|---|---|---|---|---|
| −10 | | 10 | 0.250 | 300 |
| 0* | 0 | 10 | 0.230 | 276 |
| 8 | 8 | 13 | 0.160 | 192 |
| 26 | 18 | 11 | 0.054 | 65 |
| 47 | 21 | 17 | 0.060 | 72 |

TABLE 3-continued

Capacity of PEI/Glycerol Fliter Theoretical Capacity 3.7 g HCHO.

| Time hr | Time Interval hr | Rate of Weight Loss of Paraformaldehyde mg/hr | [HCHO] ppm | [HCHO] µg/m³ |
|---|---|---|---|---|
| 74 | 27 | 11 | 0.041 | 49 |
| 95 | 21 | 21 | 0.065 | 78 |
| 122 | 27 | 13 | 0.044 | 53 |
| 144 | 22 | 15 | 0.057 | 68 |
| 170 | 26 | 18 | 0.088 | 105 |
| 191 | 21 | 20 | 0.126 | 151 |
| 218 | 27 | 18 | 0.173 | 207 |
| 239 | 21 | 16 | 0.266 | 319 |

*Fan on filter turned on.

Based on the assumption that when the concentration of formaldehyde in the chamber is constant then the rate at which formaldehyde is introduced into the chamber is equal to the rate at which the formaldehyde leaks from the chamber plus the rate at which the formaldehyde is abosrbed by the filter, the results shows that all of the available polymeric amine is used to react with the formaldehyde. When the glycerol was not present in the filter coating only about 10% of the amine was utilized because of the lack of diffusion in the film coatings. It is possible to use a polymeric primary amine such as polyvinyl amine or polyallylamine, and under such conditions (with glycerol) a higher efficiency with formaldehyde would be expected. Polyethylene hydrazine reacts faster than the polymeric amines and would be advantageous where high levels of formaldehyde are present [i.e. $[H_2CO] > 1$ ppm].

To test the coatings for their effectiveness in removing acidic gases from air two open cell reticulated (40 pores per inch) polyurethane foam sponges (each 7 cm diameter, 2.3 cm thick) were coated with polyethylenimine/glycerol (2 parts of 50% PEI to 1 part glycerol by volume) and fitted into a glass cylinder through which the gases could be passed. A diagram of the apparatus is shown in FIG. 1. The coated, air-dried filters, 4, are placed in the glass cylindrical filter holder 5, which is connected to a calibrated flow meter 2, and air supply 9. The rate of flow of gas is controlled by the valve 1. A septum 3, between the flow meter 2, and the filter 4, allows for the injection of small amounts of gases to be tested. These gases are carried through the filter by the air flow 9, and are absorbed by a reactive solution 7, which is placed in the absorber 8, and which is fitted with a fritted glass disc 6, that disperses the gas into fine bubbles to ensure dissolution or reaction with the solution. By analysis of the solution it is possible to determine the effectiveness of the polymeric amine in removing the acidic gases injected into the gas stream.

EXAMPLE 3

For $H_2S$, use was made of a dilute solution of known volume of $CuSO_4$ which reacted with the $H_2S$.

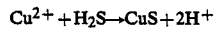

The copper was determined colorimetrically with diethyldithiocarbamate (DDTC) and from the change in concentration, the amount of $H_2S$ which passed through the foam could be calculated.

Air was allowed to pass through the system at a flow rate of 400 mL of $H_2S$ gas at NTP is equivalent to 0.04 mmoles. When the filters were absent the amount of CuS precipitated was of the order of 70 to 100% of the expected value when 0.3 mL of $H_2S$ at NTP was injected into the air stream over a 10 min period. This corresponds to a peak concentration of $0.3/(400 \times 10) = 75$ ppm. When the filter was coated with glycerol and water, the amount which passed through the system was closer to 50%. However, when the filter was treated with PEI in glycerol and water, the amount of $H_2S$ which passed thorugh the filter was less than 2% when as much as 8 mL of $H_2S$ was injected. This did not change even after 25 mL of $H_2S$ was injected. Hence, the capacity of the coating to trap $H_2S$ is not trivial.

EXAMPLE 4

For $SO_2$ the gas was absorbed in a dilute solution of KOH and the resulting solution was analyzed for $SO_3{}^{2-}$ either by Fuchsin or by $K_2HgCl_4$.

It was found that $O_2$ in air tended to oxidize some of the $SO_2$ to $SO_3$ and this interfered with the analysis. Hence, $N_2$ was used instead of air as the carrier gas.

When 0.5 mL of $SO_2$ was injected during a 10 min interval into the air before a PEI/glycerol coated filter with $N_2$ flowing at 400 mL/min., no $SO_2$ was detected in the absorber. This corresponds to a peak concentration of about 125 ppm of $SO_2$.

Similar results were obtained after 1, 5 and 10 mL of $SO_2$ were introduced into the gas stream. When the PEI was absent in the coating about 60% of the $SO_2$ passed through the filter. This is similar to results obtained with $H_2S$ and means that the glycerol dissolves some of the acidic gases. It is believed that eventually the solution would become saturated and the gases ($H_2S$ or $SO_2$) would then not be trapped at all. Other gases which can be reactively removed by polymeric amines include oxides of nitrogen (NO, $NO_2$ and $N_2O_5$) and hydrogen halides such as HF, HCl, HBr and HI.

Since tertiary amines are stronger bases than secondary or primary amines and therefore bind weak acids more strongly, the use of commercial polyethylenimine is a versatile coating for aldehydes as well as acidic gases. This is due to the fact that commercial PEI contains approximately 31–37% primary amines, 34 to 40% secondary amines and 26 to 33% tertiary amines depending on the source.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of reducing the indoor air concentration of aldehydes by coating a porous support filter with water soluble polymeric amine to which a water soluble low-volatile liquid plasticizer is added to render the coating soft and flexible and passing the indoor air through said support filter.

2. A method according to claim 1, in which the polymeric amine has primary ($-NH_2$), and tertiary

amino functional groups.

3. A method according to claim 1, in which the polymeric amine is selected from the group consisting of polyethyleneimine, polyallylamine and polyvinylamine.

4. A method according to claim 1, in which the aldehyde is selected from the group consisting of formaldehyde, acetaldehyde and acrolein.

5. A method according to claim 1, in which the low volatile liquid plasticizer is glycerol, ethylene glycol, diethylene glycol and propylene glycol, or mixtures of these.

6. A method of reducing the indoor air concentration of aldehydes by coating a porous support filter with a water soluble polymeric hydrazine to which a water soluble low-volatile plasticizer is added to render the coating soft and flexible and passing the indoor air through said support filter.

7. A method according to claim 6, in which the polymeric hydrazine is polyethylene hydrazine.

8. A method according to claim 6 in which the low volatile plasticizer is selected from the group consisting of glycerol, ethylene glycol, diethylene glycol, and propylene glycol or mixtures of these.

9. A method of reducing the indoor air concentration of acidic gases by coating a porous support filter with water soluble polymeric amine to which a water soluble low-volatile liquid plasticizer is added to render the coating soft and flexible and passing the indoor air through said support filter.

10. A method according to claim 9, in which the polymeric amine has primary ($-NH_2$), and tertiary

amino functional groups.

11. A method according to claim 9, in which the polymeric amine is selected from the group consisting of polyethyleneimine, polyallylamine and polyvinylamine.

12. A method according to claim 9, in which the acidic gas is selected from the group consisting of $H_2S$, $SO_2$, $SO_3$, $NO$, $NO_2$, $N_2O_5$, $HF$, $HCl$, $HBr$, and $HI$.

* * * * *